(12) United States Patent
Gressett

(10) Patent No.: US 6,508,617 B1
(45) Date of Patent: Jan. 21, 2003

(54) DEVICE FOR LIFTING, ORIENTING, AND POSITIONING ENCLOSURES

(75) Inventor: Charles Gressett, Norcross, GA (US)

(73) Assignee: ABB Technology AG, Zurich (CH)

( * ) Notice: Subject to any disclaimer, the term of this patent is extended or adjusted under 35 U.S.C. 154(b) by 49 days.

(21) Appl. No.: 09/709,117

(22) Filed: Nov. 9, 2000

(51) Int. Cl.$^7$ .............................................. B66C 1/10
(52) U.S. Cl. ...................................... 414/732; 414/626
(58) Field of Search ................................. 414/732, 626

(56) References Cited

U.S. PATENT DOCUMENTS

| | | | |
|---|---|---|---|
| 2,822,094 A | * 2/1958 | Greer .......................... | 414/626 |
| 3,822,800 A | 7/1974 | Leszczynski ................. | 214/370 |
| 4,762,016 A | 8/1988 | Stoughton et al. ............ | 74/479 |
| 4,842,473 A | * 6/1989 | Zbornik ....................... | 414/627 |
| 5,058,263 A | 10/1991 | Corbeij et al. ................ | 29/740 |
| 5,058,385 A | 10/1991 | Everett, Jr. ................... | 60/571 |
| 5,062,760 A | 11/1991 | Samaniego .................. | 414/542 |
| 5,102,283 A | * 4/1992 | Balzola Elorza ............ | 414/626 |
| 5,301,013 A | 4/1994 | Meijer et al. ................. | 356/400 |
| 5,344,202 A | * 9/1994 | Ramler et al. ................ | 414/627 |
| 5,429,015 A | 7/1995 | Somes .......................... | 74/665 |
| 5,440,943 A | * 8/1995 | Holt et al. ..................... | 414/626 |
| 5,487,638 A | * 1/1996 | Salsburg et al. .............. | 414/626 |
| 5,503,519 A | * 4/1996 | Schwetz et al. .............. | 414/732 |
| 5,622,468 A | * 4/1997 | Viollet .......................... | 414/626 |
| 5,709,523 A | 1/1998 | Ware ............................. | 414/715 |
| 5,720,069 A | 2/1998 | Wanner et al. ................ | 15/53.1 |
| 6,086,317 A | * 7/2000 | Kameoka ..................... | 414/772 |

OTHER PUBLICATIONS

Website: TSI Solutions, Legris 3175 Straight Connectors, http://www.4tsi.com/Legris/3175.htm, (2 pages).
Website: Legris Incorporated, LEGRIS Home Page, http://www.legris-usa.com/, (2 pages).
Website: Bimba Manufacturing Company—Roundline Stainless Steel Body Cylinders (inch), http://www.bimba.com/products/prod1.htm, (7 pages).
Website: Bimba Manufacturing Company—Rotary Actuators (inch and metric), http://www.bimba.com/products/prod7.htm, (4 pages).
Website: Midwest Control Products Corp., Metric Clevis Ends, http://www.midwestcontrol.com/page25.html, (2 pages).
Website: Busak+Shamban Group, Products—Precision O-Ring, Worldwide Locations: Americas: Marketing, http://207.174.131.33/single_product_template.asp?idproduct=7&idcategoryx1, (7 pages).
Website: THK, Locations and Products, http://www.calsmall.ne.jp/THKCat_en/THKAddress.html, (9 pages).

* cited by examiner

*Primary Examiner*—Kathy Matecki
*Assistant Examiner*—Sang Kim
(74) *Attorney, Agent, or Firm*—Woodcock Washburn LLP

(57) ABSTRACT

Manipulators for safe, 360 degree rotation along at least two axes and horizontal and vertical translation of large, heavy objects are disclosed. Manipulators of the present invention include a support structure or open framework, a carriage, and an inner framework assembly. In some embodiments of the present invention, the inner framework assembly can be oriented substantially horizontally or substantially vertically. The inner framework assembly engages the work piece through the use of a support member that has one or more extension arms attached to its bottom surface which have one of more part grips at its ends. The extension arms further include a pair of rotating shafts that allow the work piece to rotate 360 degrees preferably along the central axis of the part grips. The inner framework assembly is capable of rotating 360 degrees about the axis of the central shaft. The carriage of the manipulator of the present invention comprises a handle and a hoist that enables horizontal and vertical translation of the inner frame assembly and work piece attached thereto.

17 Claims, 15 Drawing Sheets

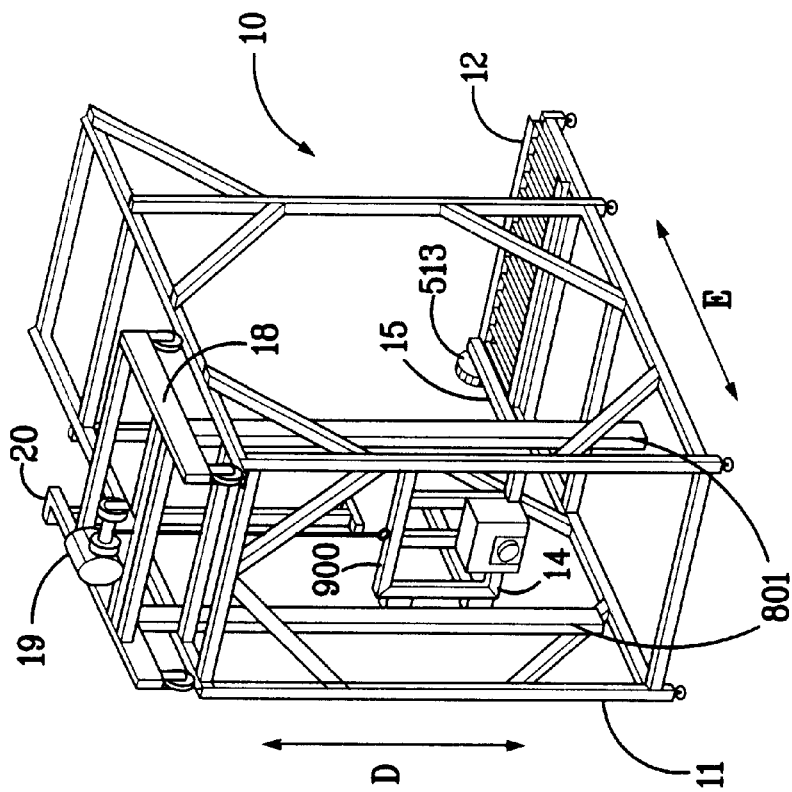
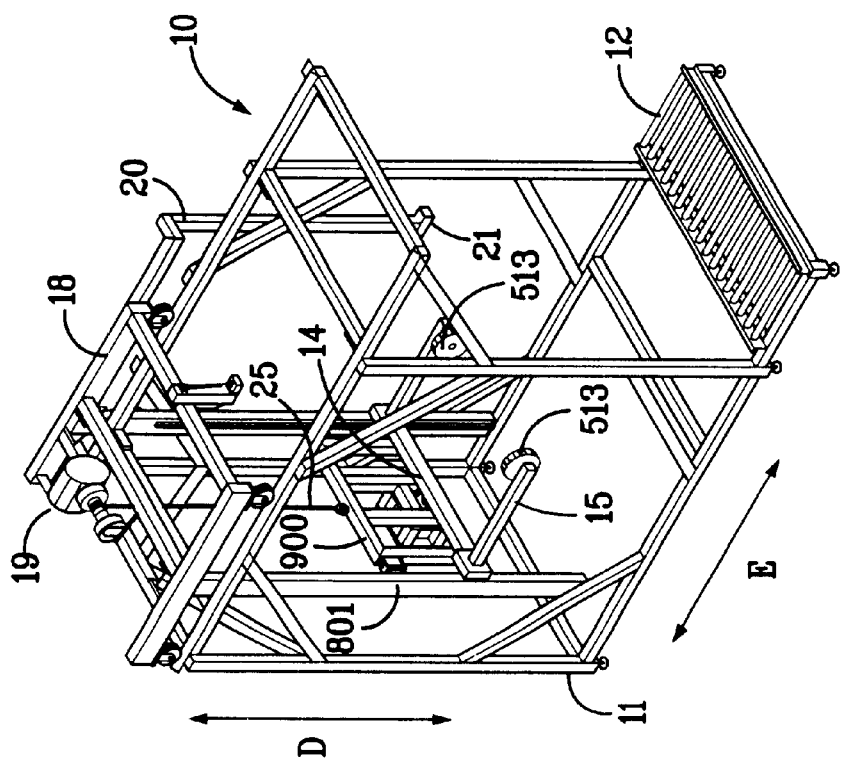

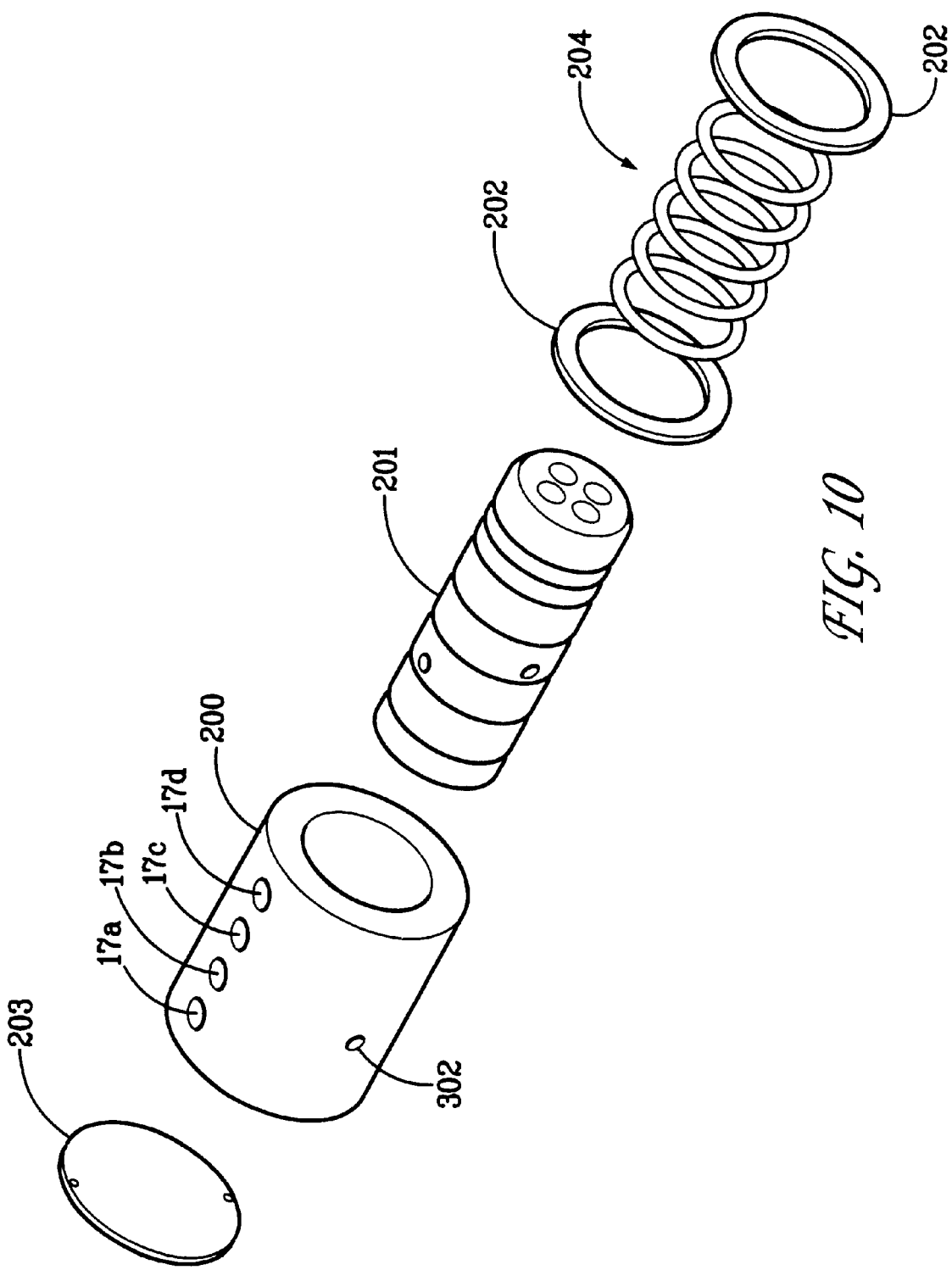

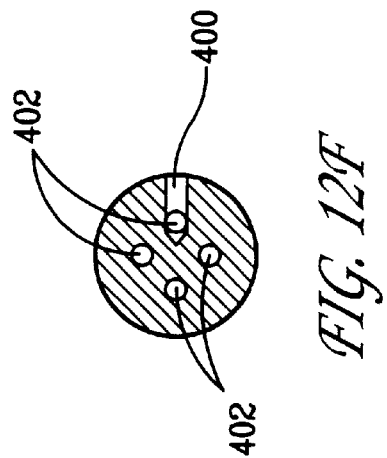
FIG. 12E
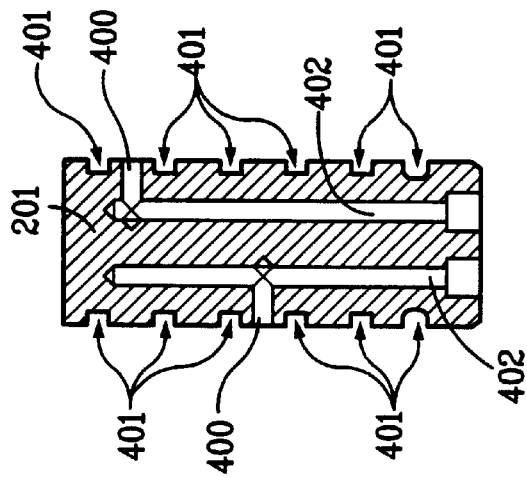
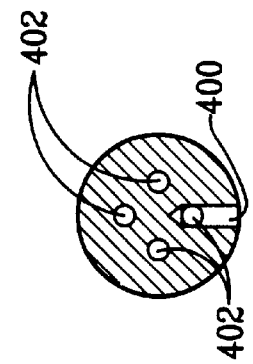
FIG. 12F
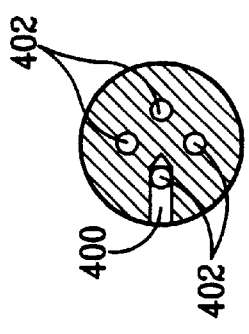
FIG. 12G
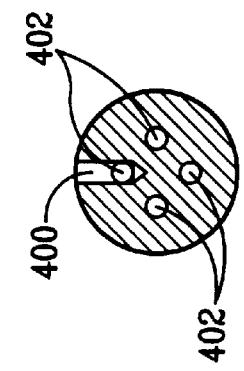
FIG. 12H
FIG. 12I

DEVICE FOR LIFTING, ORIENTING, AND POSITIONING ENCLOSURES

FIELD OF THE INVENTION

The present invention relates generally to manipulators. More particularly, the present invention relates to manipulators that comprise part grips, such as vacuum gripper cups, and a unique rotary union for safe, 360 degree rotation of large, heavy objects and translation along 2 axes.

BACKGROUND OF THE INVENTION

It is often necessary to lift and manipulate large, heavy objects during a manufacturing process, such as, for example, during the process of welding steel enclosures (known as "tanks") for transformers, particularly pad-mounted transformers. These large, usually rectangular tanks can be automatically welded or welded by hand.

In electrical power distribution systems, distribution transformers are used to step down voltage between the high voltage power line and the user. Transformers are typically mounted above ground on a junction pole, or at ground level on a pad or platform. The increased use of underground power distribution systems has resulted in a corresponding increase in the number of pad-mounted transformers. The transformer includes a tank, which contains the core and coil assembly immersed in oil, and a cabinet, which includes a top hinged door and a bolted in place sill. Connections for incorporating the transformer assembly into the power distribution system extend through one wall of the tank and are enclosed by the cabinet. In order to provide utility personnel the necessary access to the transformer connections, the cabinet must also include a door. The cabinet door is pivotally attached to the tank along the top edge of the front plate of the tank. The cabinet also includes a low sill extending forward from the transformer tank, upon which the cabinet door rests when closed.

Transformer enclosures are generally fabricated from two to four metal sheets. The sheet material for these tanks are generally less than 10-gauge carbon steel or 10-gauge stainless steel. However, other kinds and gauges of metals may be used depending upon customer requirements. It is important that the method of fabrication for these enclosures be flexible enough to accommodate the broad range of enclosures that are fabricated in the transformer assembly line. The geometry of these enclosures is typically a three-dimensional box, i.e., cube-shaped or rectangular parallelepiped-shaped, but can also be extended to other shapes such as cylinders. The dimensions of the sheets that comprise these enclosures vary depending upon customer requirements. For example, a rectangular parallelepiped-shaped transformer enclosure generally comprises a front panel, a tank wrapper, a door wrapper, and a door top.

The metal sheets that comprise the transformer tanks are typically mated together in a series of welds to form a six-sided enclosure. The seam welding of the various panels that comprise the transformer tank is typically performed by an automated assembly process, such as via a robotic welder. Further welds are needed to join or affix additional parts or components to the tanks. Additional hardware or components are welded onto one or more sides of the enclosure via manual welding. The welding of components is more suitable for manual welding due to the varying locations (i.e., interior or exterior surfaces, horizontal or vertical surfaces) for these components and the size and location of the welds.

For typical transformer enclosures, hardware is manually welded onto four of the six sides of the enclosure via conventional welding processes known in the art such as tungsten inert gas (TIG) welding and metal inert gas (MIG) welding. The large and cumbersome metal enclosures can weigh in excess of several hundred pounds and are manipulated by hand on a roller bed conveyor or lift table. The components are welded onto the horizontal or vertical tank surfaces that are within reach of the operator. Once the weld on the particular surface is completed, the tank is rotated or flipped manually to present another surface for welding.

As a tank typically weighs more than 50 pounds (and frequently up to as much as 150 pounds or more), a tank is too heavy and too large for an ordinary person to move from the lift table or conveyor to the manual welding station, or vice versa, without the aid of a manipulator. Because of these difficulties in handling of the workpiece, this method increases the likelihood of occupational injuries. An additional drawback is operator fatigue. Operator fatigue increases as a result of manipulation of these enclosures over the course of many hours and can lead to an overall decrease in the efficiency of the manual welding process. Moreover, operator fatigue can also lead to an increase in quality problems in the manual welding process.

Other quality problems attributable to the manual welding process are related to the nature of the design of the enclosure. Welding of a horizontal surface and then a vertical surface is generally not optimal for consistent welds. In conventional manual welding processes, the voltage and current of the welding arc determine the fluidity of the molten weld puddle. If the angle varies for the different components that are joined to the enclosure, the molten weld puddle may run faster or slower due to gravity thereby causing the size and shape of the weld to change. The current arrangement of settings at the manual welding stations are not adjustable for each new weld surface and may alter the quality of the welds. Thus, there is a need in the art for a manipulator that may be incorporated into the manual welding workstation that can aid a person in lifting and manipulating large, heavy objects, while translating the object along 2 axes and rotating the objects up to 360 degrees on two different axes to expose new weld surfaces.

SUMMARY OF THE INVENTION

The present invention overcomes difficulties in the handling and manipulation of large, cumbersome objects, such as transformer tank enclosures, by providing manipulators and apparatuses for safe, 360 degree, 2 axis rotation and translation of large, heavy objects. The apparatuses of the present invention allow an operator to safely and easily manipulate the work piece by minimizing contact with the tank. The manipulator of the present invention affords the operator the flexibility to position any of the surfaces of the work piece to an optimal height and angle to be worked upon. Furthermore, the manipulator of the present invention reduces the physical exertion required by the operator to lift, position, and orient the tanks that weigh upwards of about 150 pounds thereby minimizing injuries to the operator. Lastly, the manipulator of the present invention is adjustable to accommodate the height of the operator as well as the dimensions of the work pieces.

The manipulator of the present invention is comprised of a framework that supports a rotatable, inner frame assembly that is joined to a hoist that is mounted onto a carriage. The inner frame assembly engages the object or work piece and holds it in place. The inner frame assembly comprises a support member which can be mounted either horizontally or vertically. The support member further comprises a plurality of extension arms that are located at opposite ends of the support member. These extension arms comprise a plurality of rotary shafts that terminate with one or more part grips that engage the object or work piece. The part grips preferably engage the object at opposing surfaces of the object, near or at the object's center of gravity. The part grips may engage the object through the use of vacuum, magnetic, mechanical, or similar means to securely hold the object. In preferred embodiments, the part grips are gripper cups in which a vacuum is drawn against the surfaces of the object thereby holding it in place.

The rotary shafts, disposed at the end of the extension arms on the inner frame assembly, allow the operator to rotate the object forward or backward, preferably along the axis of the part grips. The rotary shafts are comprised of one or more bearings and rotary actuators in which the operator can rotate the object forward and backward 360° along a horizontal axis with minimal effort. In preferred embodiments, the rotary shafts further comprise one or more brakes to hold the object in position while the operator is working on the surface of the object.

The object can be further manipulated through the use of a shaft attached to the top surface of the support member on the inner frame assembly, preferably substantially in the center axis of the support member. The shaft is preferably parallel to the orientation of the extension arms. For example, in embodiments where the extension arms are horizontal, the shaft is also horizontal whereas in other embodiments where the extension arms are vertical, the shaft is also vertical. This shaft further comprises a rotary union that allows the passage of air, vacuum, or other means to operate various actuators, brakes, and holders associated with the inner frame assembly. In embodiments where the shaft is horizontal, the object can be rotated horizontally 360° clock-wise about the axis of the central shaft. In other embodiments where the shaft is vertical, the object can be rotated vertically 360° about the axis of the central shaft. One or more actuators and one or more brakes facilitate the movement and stoppage of the object as it is being rotated about the central axis of the shaft.

The inner frame assembly and work piece connected thereto, can translate vertically and horizontally by means of a carriage assembly that further comprises a hoist. The carriage assembly preferably travels upon rails located at the top of the framework. A hoist, such as, but not limited to, a pneumatic hoist or air hoist, engages the inner frame assembly and object connected thereto to allow the operator to vertically adjust the height of the object. The carriage assembly further comprises a handle that contains controls to operate the hoist as well as allow the operator to horizontally translate the inner frame assembly from a first position to a second position. The carriage assembly and open framework is further comprised of a plurality of bearings that allow the interior frame assembly, and object or work piece contained therein, to translate linearly, preferably vertically, from a first position to a second position. The operator can then operate the hoist to raise and lower the inner frame assembly and work piece attached thereto. In some embodiments in which the inner frame assembly is oriented horizontally, the inner frame assembly is mounted onto a yoke assembly which is connected to the hoist by a linkage, such as a cable. The yoke assembly engages bearings or linear motion blocks on the side of support beams attached to the carriage to facilitate vertical translation.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific apparatus and methods disclosed.

FIG. 5 provides a front, isometric view of another embodiment of the apparatus of the present invention in which the inner frame assembly is substantially horizontal.

FIG. 6 provides a back, isometric view of the embodiment of the apparatus of the present invention depicted in FIG. 5.

FIG. 10 provides a detailed, exploded view of an embodiment of the rotary union of the inner rotatable assembly of FIG. 9.

FIG. 12e provides a detailed, cross-sectional view of an embodiment of the valve body of the rotary union of the inner rotatable assembly of FIG. 10 taken along sectional line F—F of FIG. 12c.

FIGS. 12f, 12g, 12h, and 12i provide detailed, cross-sectional views of an embodiment of the valve body of the rotary union of the inner rotatable assembly of FIG. 10 taken along sectional lines A—A, B—B, C—C, and D—D, respectively, of FIG. 12b.

Figure 2:
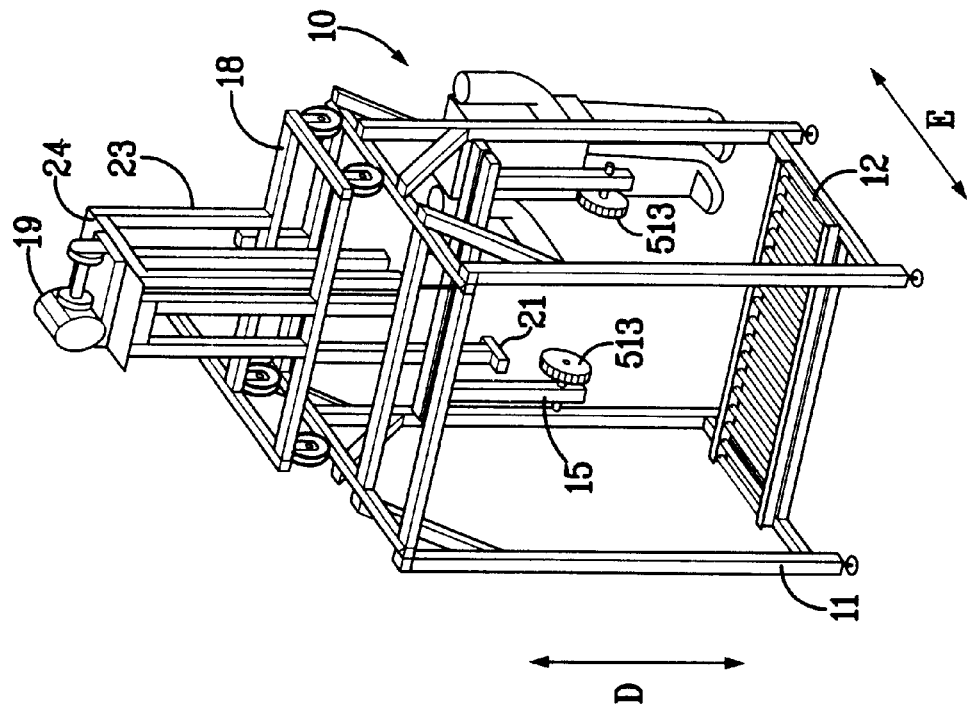
FIG. 2 provides a back, isometric view of the embodiment of the apparatus of the present invention depicted in FIG. 1.
Figure 1:
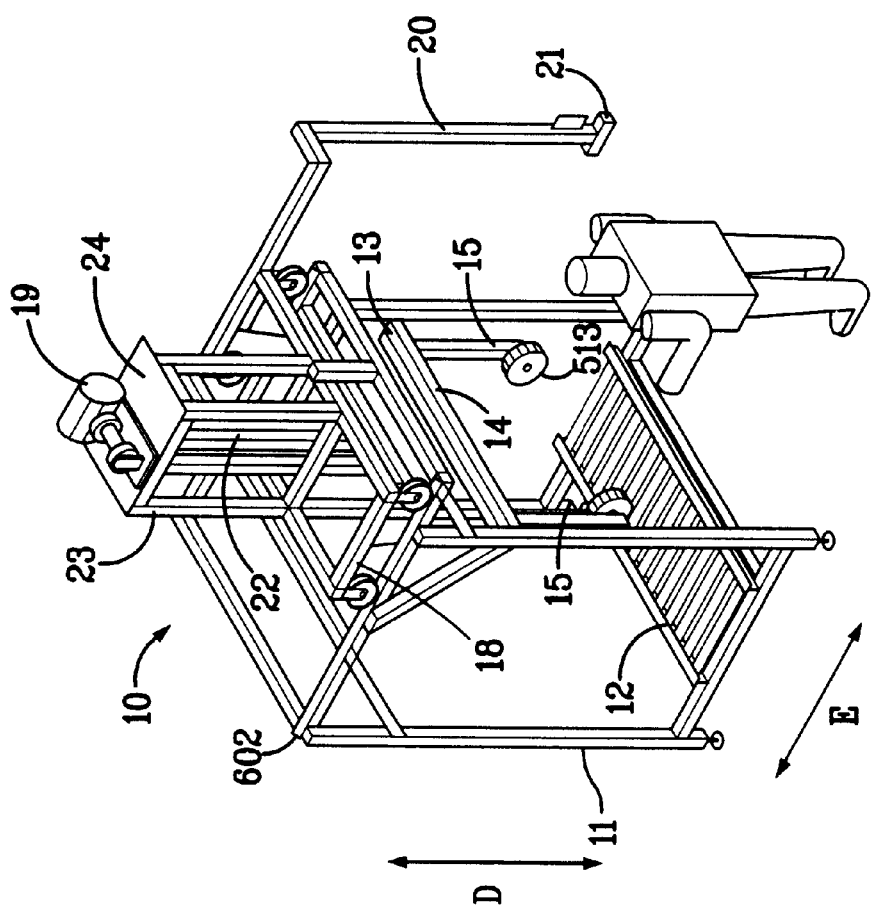
FIG. 1 provides a front, isometric view of one embodiment of the apparatus of the present invention in which the inner frame assembly is substantially vertical.
Figure 4:
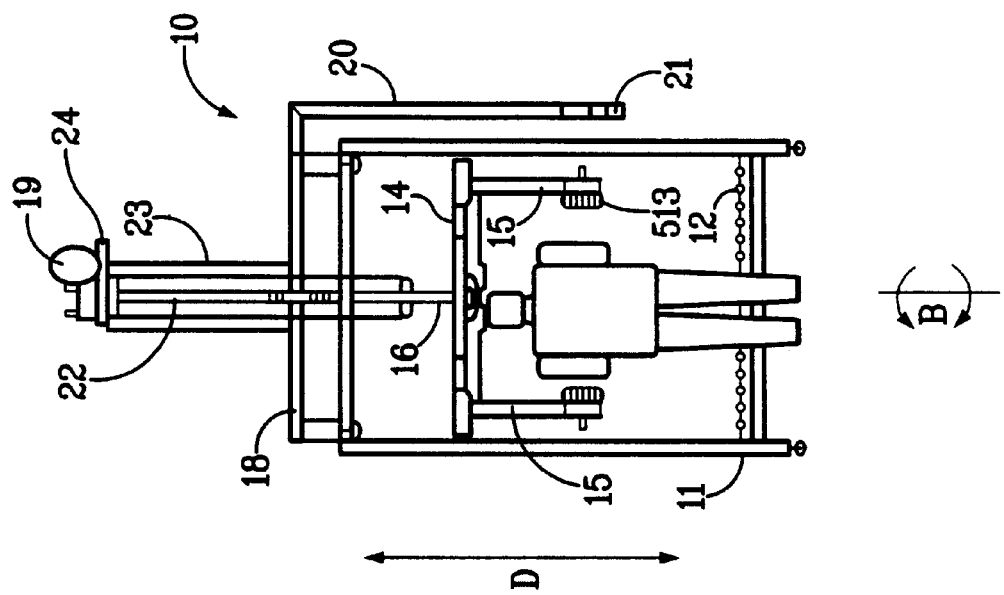
FIG. 4 provides a front view of the embodiment of the apparatus of the present invention depicted in FIG. 1.
Figure 3:
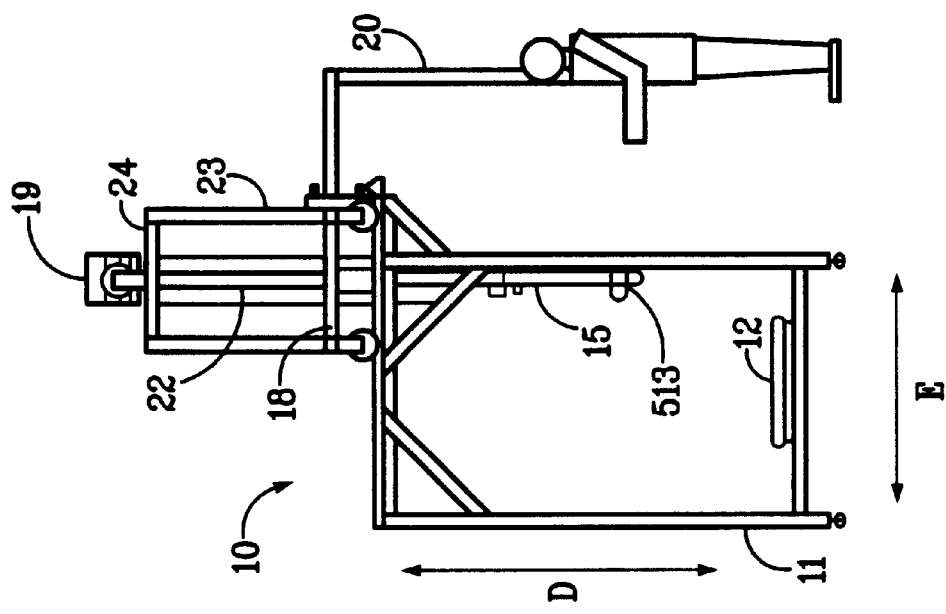
FIG. 3 provides a side view of the embodiment of the apparatus of the present invention depicted in FIG. 1.
Figure 8:
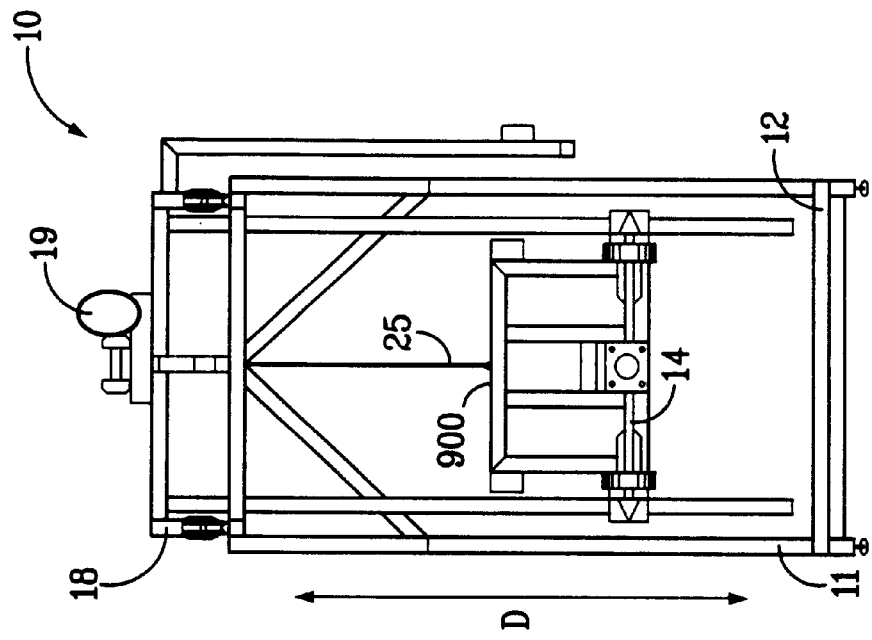
FIG. 8 provides a front view of the embodiment of the apparatus of the present invention depicted in FIG. 5.
Figure 7:
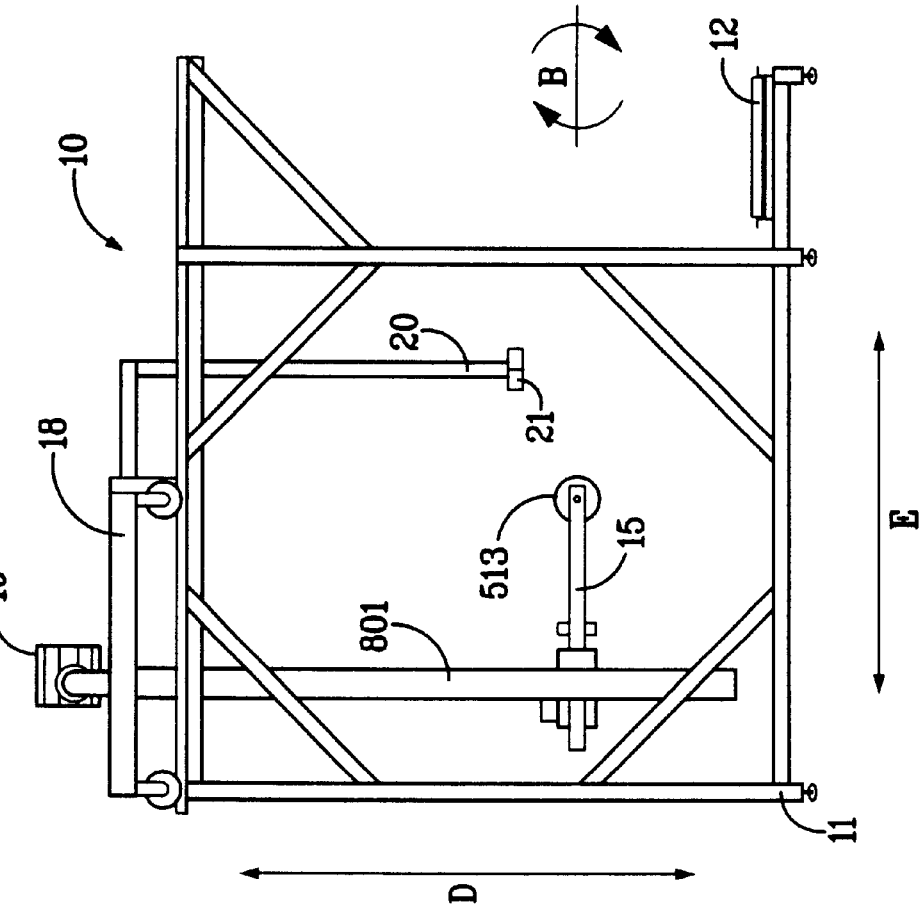
FIG. 7 provides a side view of the embodiment of the apparatus of the present invention depicted in FIG. 5.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention, such as its application to other electrical or mechanical devices, will be apparent from the following Detailed Description and the accompanying drawings.

DETAILED DESCRIPTION OF PREFERRED EMBODIMENTS

The present invention overcomes difficulties in the handling and manipulation of large, cumbersome objects, such as transformer tank enclosures, by providing manipulators and apparatuses for safe, 360 degree, 2 axis rotation and translation of large, heavy objects. The apparatuses of the present invention allow an operator to safely and easily manipulate a work piece by minimizing contact with the tank. The manipulator of the present invention affords the operator the flexibility to position any of the surfaces of the work piece to an optimal height and angle to be worked upon. Furthermore, the manipulator of the present invention reduces the physical exertion required by the operator to lift, position, and orient the tanks that weigh up to about 150 pounds thereby minimizing injuries to the operator. Lastly, the manipulator of the present invention is adjustable to accommodate the height of the operator as well as the dimensions of the work pieces.

A manipulator according to the present invention is an apparatus that can be used to safely lift, rotate, and translate a large object, such as a rectangular enclosure. The manipulator of the present invention incorporates a series of actuators that alleviates the weight of the object or work piece. The open framework of the apparatus may straddle a conveyor belt in an automated assembly line. In a preferred embodiment, the present invention can be used to lift an enclosure from a transport cart or conveyor in one orientation, rotate the enclosure, and place the enclosure back on the cart or conveyor in another orientation to accommodate the next operation.

FIG. 1 through FIG. 4 and FIG. 5 through FIG. 8 depict two embodiments of the manipulator or apparatus 10 of the present invention. FIG. 1 through 4 depict a vertical manipulator (because inner frame assembly 13 is oriented vertically) whereas FIGS. 5 through 8 depict a horizontal manipulator (because inner frame assembly 13 is oriented horizontally). Apparatus 10 is comprised of a framework structure or support structure 11 that preferably has an open interior space. In preferred embodiments, structure 11 further supports a conveyor belt 12 that transports the work-piece or object (not shown in the figure) from the previous manufacturing operation to be manipulated during the welding or other manufacturing operation. In other embodiments, work pieces or objects to be manipulated can be brought to the apparatus via a transport cart that is rolled into, or adjacent to, structure 11. The work piece or object is lifted off of conveyor belt 12 or transport cart (not shown in the figures) and held in place by the inner frame assembly 13.

Figure 9:
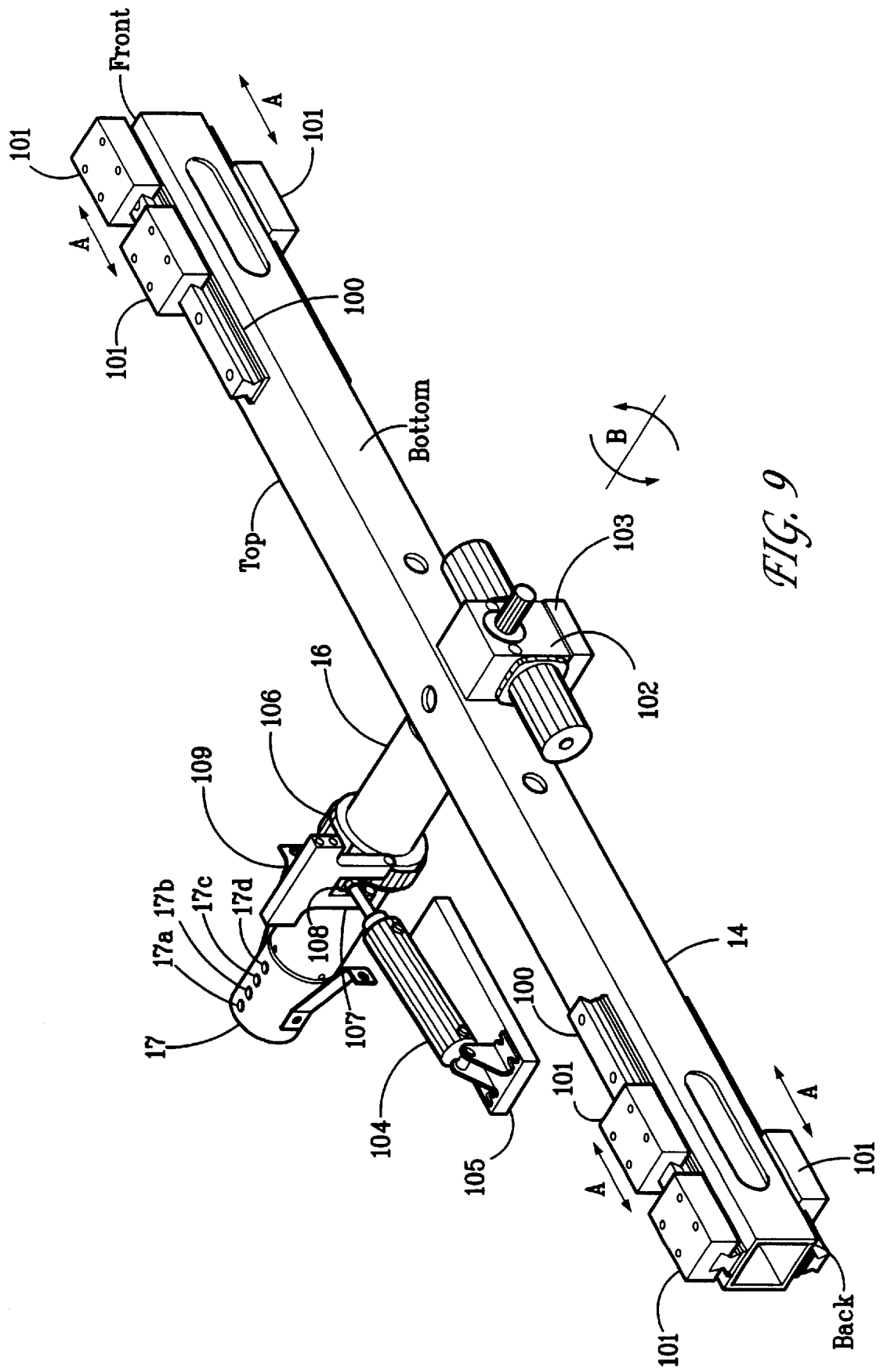
FIG. 9 provides a detailed view of an embodiment of the support member of the inner rotatable assembly of the present invention.

Inner frame assembly 13 is comprised of a support member 14 (not shown in FIG. 7), one or more extension arms 15, a central shaft 16 (shown in FIG. 4 and FIG. 5), and a rotary union 17 (see details of rotary union provided in FIG. 10, FIG. 1a through 11d, and FIG. 12a through 12i). As shown in both embodiments illustrated in FIG. 1 through 4 and FIG. 5 through 8, support member 14 has a top, bottom, front, and back surfaces and a first and second end. FIG. 9 provides a detailed illustration of one embodiment for support member 14.

Support member 14 is preferably hollow to provide a conduit for electrical, air, vacuum or any other operational means through the support member to other sub-components of the inner frame assembly 13 attached thereto. As shown in the presently preferred embodiment in FIG. 9, support member 14 has a plurality of bolt plates 100 that are joined, preferably welded, on the front and back surfaces of support member 14. A series of linear motion system ("LMS") blocks 101, such as the LM blocks, part no. SR30W blocks manufactured by THK Manufacturing of America, Inc., are then placed atop bolt plates 100 to act as guide rails. LM blocks 101 allow translation of the extension arms (not shown in FIG. 9) from a first position to a second position, preferably towards or away from the mid-point of support member 14 as indicated by arrows A in FIG. 9, to engage the work piece.

Referring again to FIG. 9, a rotary actuator 102, such as the PNEU-TURN® rotary actuator manufactured by Bimba Manufacturing Company of Monee, Ill., is joined to the bottom surface of support member 14. Rotary actuator 102 is preferably coupled to a portion of central shaft 16 to allow 360° rotation of the support member about the central axis of central shaft 16 as indicated by arrows B and is supported by support block 103. In embodiments where the inner frame assembly is oriented substantially horizontal, the inner frame assembly and work piece attached thereto rotates 360 degrees about a horizontal axis whereas in embodiments where the inner frame assembly is oriented substantially vertically, the inner frame assembly and work piece rotates 360 degree about a vertical axis.

Central shaft 16 is mounted, or preferably rotatably coupled, to the top surface of support member 14. Referring again to FIG. 9, preferably, central shaft 16 is mounted to support member 14 substantially central to, or substantially midway, between the first and second ends of support member 14. Central shaft 16 is further comprised of, or joined to, rotary union 17. Rotary union 17 has a plurality of openings, 17a, 17b, 17c, and 17d, that allows the passage of air, gases, vacuum, electrical controls, and other operational means to control the various sub-components of inner frame assembly 13. As shown in FIG. 9, in preferred embodiments, a brake system is provided that is comprised of a brake cylinder 104 (such as a standard line cylinder manufactured the Bimba Manufacturing Company of Monee, Ill.), mounting plate 105, band brake 106 (such as a standard band brake supplied by Northern Hydraulics Tool of Burnsville, Minn.), band brake anchor pin 107, clevis brake cylinder rod end 108 (such as a clevis end made by Midwest Control Products Corp. of Bushnell, Ill.), and support strap 109. This brake system is placed at the junction of rotary union 17 and central shaft 16 to impede the rotation of the inner frame assembly 13 and any work pieces or objects attached thereto.

Figure 11B:
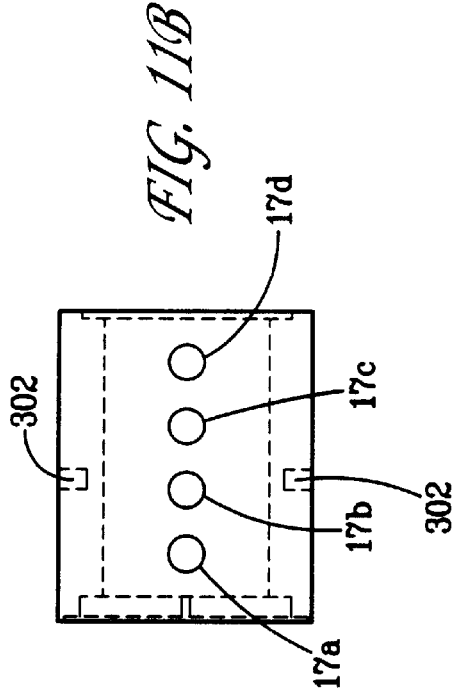
FIG. 11b provides a detailed, side view of an embodiment of the valve sleeve of the rotary union of the inner rotatable assembly of FIG. 10.
Figure 11D:
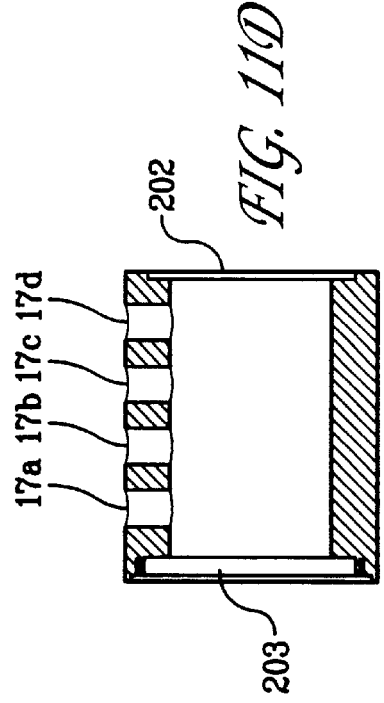
FIG. 11d provides a detailed, cross-sectional view of an embodiment of the valve sleeve of the rotary union of the inner rotatable assembly of FIG. 10 taken along sectional line A—A of FIG. 11c.
Figure 11A:
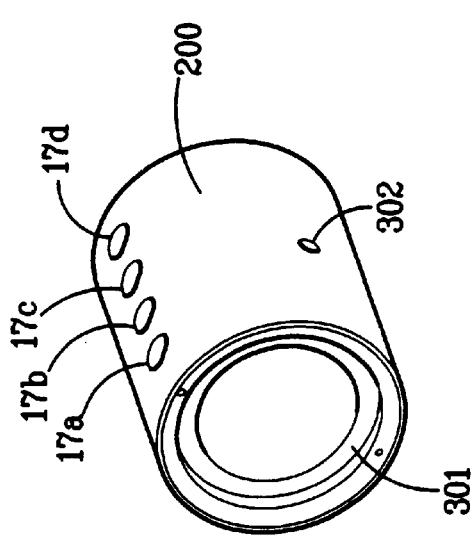
FIG. 11a provides an isometric view of an embodiment of the valve sleeve of the rotary union of the inner rotatable assembly of FIG. 10.
Figure 11C:
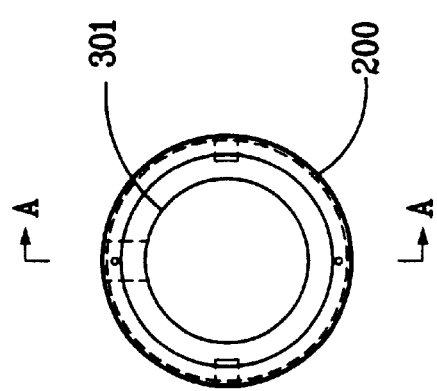
FIG. 11c provides a detailed, front view of an embodiment of the valve sleeve of the rotary union of the inner rotatable assembly of FIG. 10.
Figure 12B:
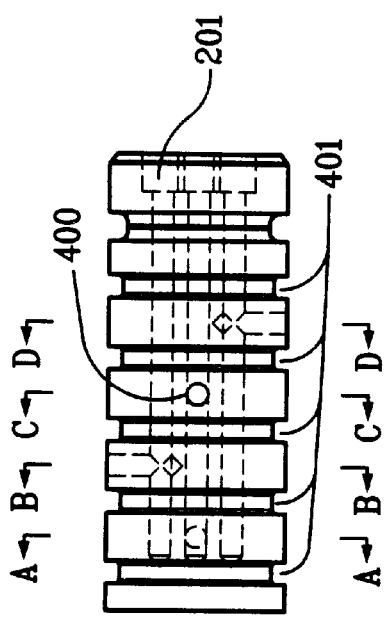
FIG. 12b provides a detailed, side view of an embodiment of the valve body of the rotary union of the inner rotatable assembly of the FIG. 10.
Figure 12D:
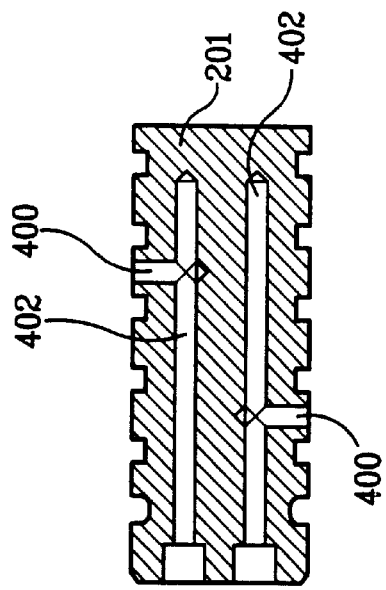
FIG. 12d provides a detailed, cross-sectional view of an embodiment of the valve body of the rotary union of the inner rotatable assembly of FIG. 10 taken along sectional line E—E of FIG. 12c.
Figure 12A:
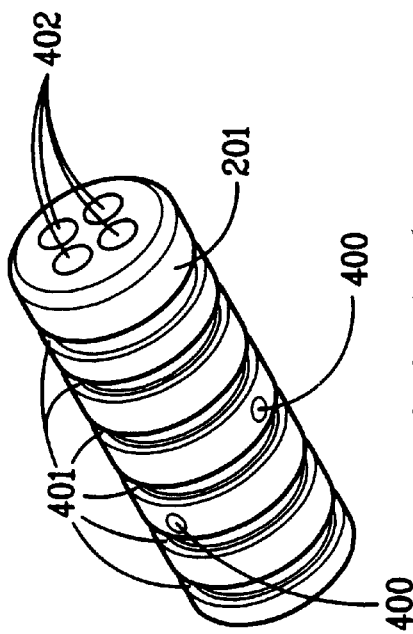
FIG. 12a provides a detailed, isometric view of an embodiment of the valve body of the rotary union of the inner rotatable assembly of the FIG. 10.
Figure 12C:
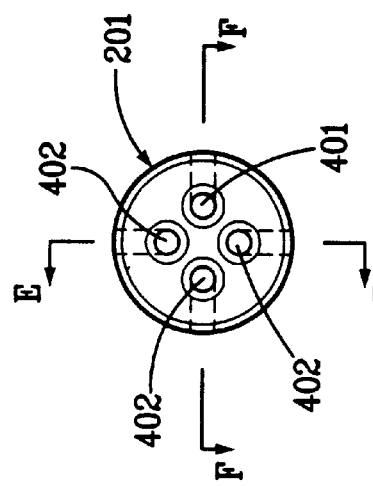
FIG. 12c provides a detailed, front view of an embodiment of the valve body of the rotary union of the inner rotatable assembly of the FIG. 10.

In the embodiment shown in FIG. 9, rotary union 17 is a four way rotary air union that feeds into and operates the various pneumatic brake systems, linear actuators, rotary actuators, and extension arms 15 of the inner frame assembly. However, other rotary unions with different configurations can operate various sub-components of the inner frame assembly 13 or apparatus 10 without departing from the present invention. A detailed, exploded view of one embodiment of the rotary union 17 of the present invention is shown in FIG. 10. FIG. 10 shows the various sub-components that may comprise rotary union 17: a multi-port valve sleeve 200, a multi-port valve body 201, a pair of bearings 202 (such as sintered bronze bearings made by Symmco, Inc. of Sykesville, Pa.), line fitting 203 (such as a nickel plated, brass line fitting, part no. 3175 5611 manufactured by Legris, Inc. of Mesa, Ariz.) to direct the flow of air and/or vacuum through rotary union 17, and a plurality of O-rings 204 (such as the PRECISION part no. 326 nitrile O-ring provided by Busak and Shamban of Torrance, Calif.) to provide a seal between each of the openings on valve body 201. FIGS. 11a through 11d provide further detailed illustrations of an isometric view, a side view, a front view, and a cross-sectional view taken along line A—A of FIG. 11c, respectively, of the embodiment of valve sleeve 200 provided in FIG. 10. As these figures illustrate, valve sleeve 200 is preferably a hollow, cylindrical shaped body with a plurality of openings (17a through 17d) and a concentric, hollow central core or insert 301 that is dimensioned to fit within valve sleeve 200. Further openings 302 extend into valve sleeve 200 but do not break thru into central core 301. The cross-sectional view provided in FIG. 11d shows the relationship between line fitting 203 and one of the bearings 202.

FIGS. 12a through 12i provide detailed views of various aspects of the embodiment of valve body 201 depicted in FIG. 10. As these figures illustrate, valve body 201 is preferably a cylindrical body that has a plurality of grooves 401 on its outer surface to accommodate O-rings 204 and other components. Valve body 201 is dimensioned to fit within the interior of multi-port valve sleeve 200 with the O-rings 204 placed within the grooves of valve body 201. As FIGS. 12c through 12i show, valve body 201 further comprises one or more openings 400 and one or more gaseous pathways 402 contained therein that extend from one or both ends of valve body 201 (see FIGS. 12c, 12d, and 12e) and are supplied by incoming gas or vacuum from the plurality of openings, 17a, 17b, 17c, and 17d, contained within valve sleeve 200. Preferably, the number of gaseous pathways 402 coincides with the number of openings on the surface of rotary union 17 that extend to the core of valve sleeve 200. In the embodiment shown in FIGS. 12a through 12i, there are four gaseous pathways 402 that coincide with the four openings 17a through 17d. Therefore, as FIG. 12f through 12i illustrate, openings 17a through 17d intersect independent gaseous pathways 402 to provide separate flows of air, vacuum, or similar means to power operate various sub-components on inner frame assembly 13. In preferred embodiments, manipulator 10 is operated by a pneumatic or air supply at pressures which range from about 50 to about 100 psi, or more preferably, about 100 psi.

As shown in FIGS. 1 through 7, one or more extension arms 15 are attached to the bottom surface of support member 14. In preferred embodiments, a pair of extension arms 15 are mounted at opposite ends, or the first and second end, and to the bottom surface of support member 14. Similar to support member 14, extension arms 15 are hollow to provide a conduit for electrical, air, vacuum or any other operational means through the extension arms.

Figure 13:
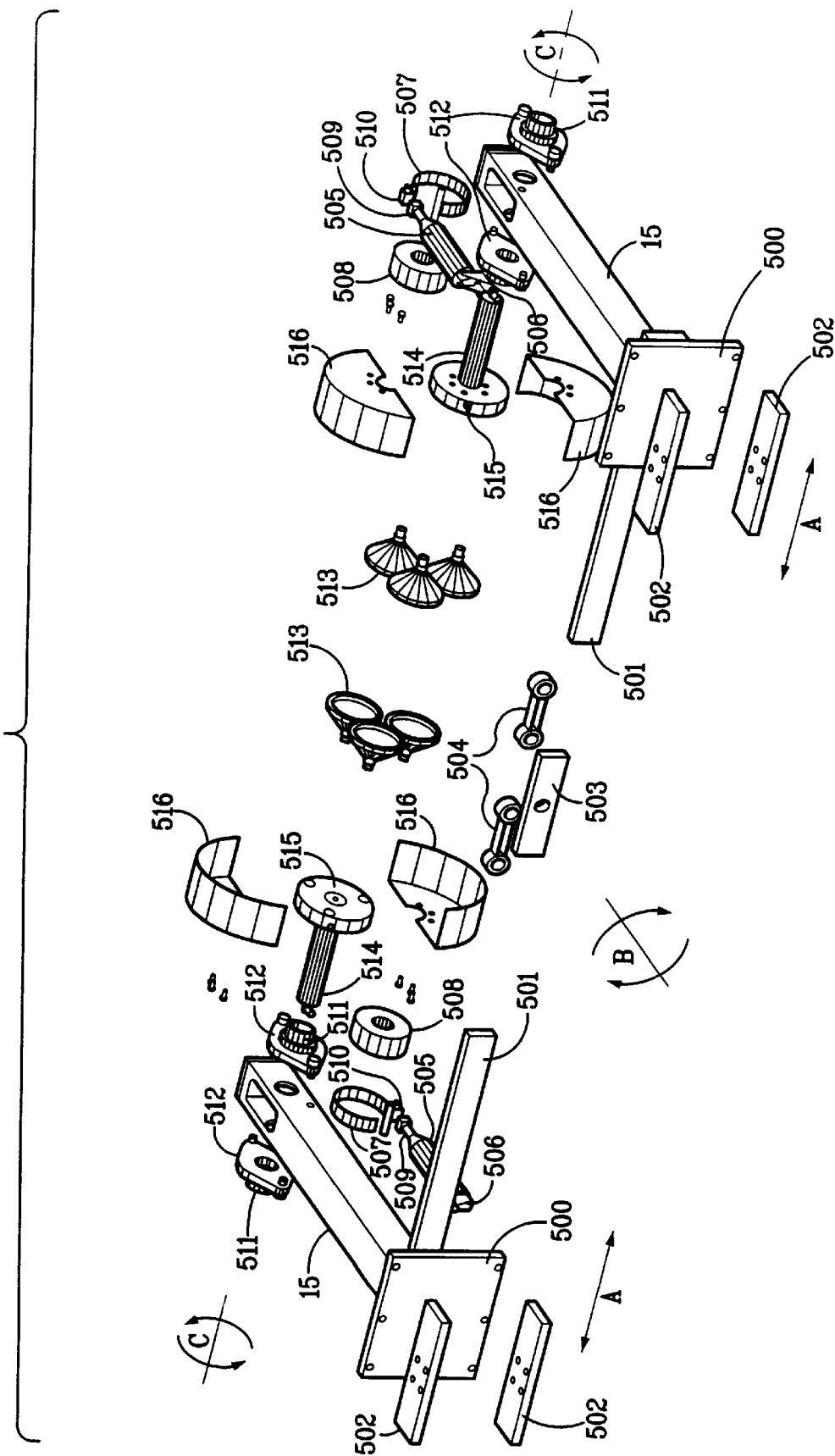
FIG. 13 provides a detailed, exploded view of an embodiment of the extension arms of the inner rotatable assembly of the present invention.

FIG. 13 provides a detailed, exploded view of an embodiment of extension arms 15. In the embodiment shown in FIG. 13, extension arms 15 are mounted to support member 14 (not shown in the figure) through the use of a mounting plate 500 and draw bar 501 to provide stability. Extension arms are preferably joined to the LM blocks 101 (see FIG. 9) through the use of adapter plates 502. This arrangement allows translation of the extension arms from a first position to a second position, preferably towards or away from the mid-point of support member 14 as indicated by arrows A. As FIG. 13 further illustrates, a rotary actuator linkage 503 and one of more rod-eye assemblies 504 are joined to rotary actuator 102 (see FIG. 9). Extension arms 15 may further include a locking rachet (not shown in FIG. 13) to prevent arms 15 from separating while gripping and rotating the work piece.

Extension arms 15 further comprise a plurality of rotating shaft assemblies, brake assemblies and work piece part grips. The part grips engage the work piece (not shown in the figure) and hold it securely within reach of extension arms 15, preferably near the work piece's center of gravity. The rotating shaft assemblies allow the work piece to rotate 360° clock-wise and counter-clock-wise in the direction illustrated by arrows C, preferably along the central axis of the part grips. Extension arms 15 further comprise brake assemblies to stop the rotation of the work piece and hold the work piece in a fixed position.

In the embodiment shown in FIG. 13, the rotary shaft assemblies on each of extension arms 15 are comprised of a pivotable air cylinder 505 (such as a standard line cylinder manufactured the Bimba Manufacturing Company of Monee, Ill.) and pivot bracket 506 (such as pivot bracket D-229 manufactured by the Bimba Manufacturing Company of Monee, Ill.). Pivotable cylinder 505 engages a brake assembly comprised of band brake 507 (such as a standard band brake supplied by Northern Hydraulics Tool of Burnsville, Minn.), brake plate 508, anchor pin 509, and pull pin 510. A plurality of ball joint bearings 511 are supported by a series of flanges 512 and placed on each side of extension arm 15 to facilitate 360° rotation in the direction of arrows C. Part grips 513 that engage the work piece are preferably a plurality of vacuum gripper cup assemblies that further comprise a vacuum cup axle 514, vacuum cup manifold 515, and splatter guard 516. The part grip depicted in FIG. 13 shows a vacuum-operated gripper that allows vacuum to be drawn onto the surface of the work piece throughout the duration of manipulation thereby keeping the work piece fixed in place. However, other means such as, but not limited to, pneumatic, magnetic, electrical, or mechanical means, can be used to engage and hold the work piece without departing from the spirit of the present invention.

In preferred embodiments, a vacuum, that ranges from about 20 to about 30 in Hg, or more preferably about 22 in Hg, is drawn on the left and right sides of the transformer tank enclosure. This vacuum is generated via the Bernoulli's principle, i.e. forcing air through a narrower diameter to decrease the pressure. In preferred embodiments, about 20 to about 30 in Hg vacuum pressure is thereby applied to about a 4 inch diameter of the left and right side tank enclosure surface.

Figure 14A:
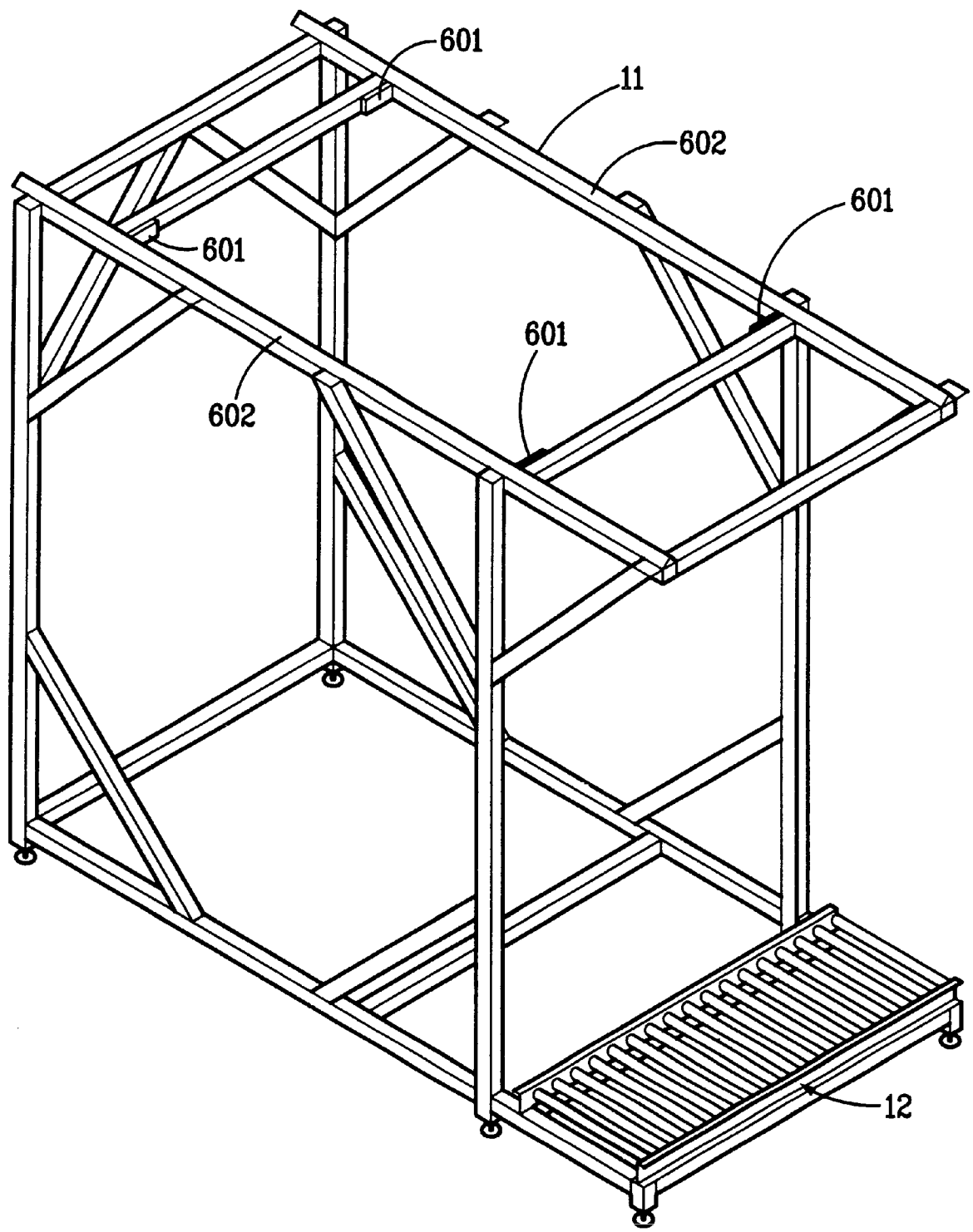
FIG. 14a provides a detailed, front isometric view of an embodiment of the open framework of the present invention.
Figure 14B:
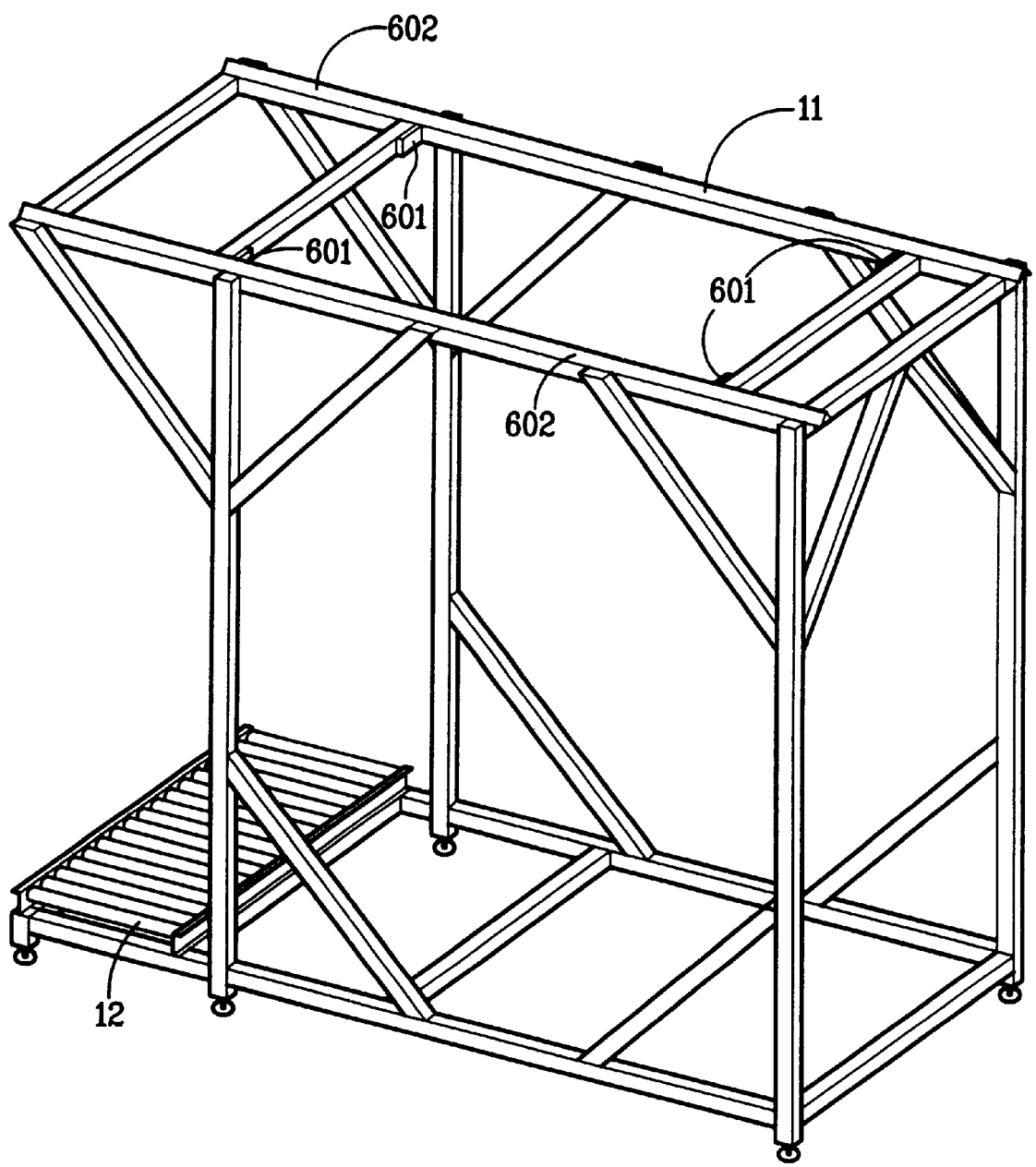
FIG. 14b provides a detailed, back isometric view of an embodiment of the open framework of the present invention.

Referring to FIGS. 1 through 8, work pieces or objects can be translated vertically and horizontally in the directions illustrated by arrows D and E via a carriage 18 that is placed onto structure 11. FIGS. 14a and 14b provide front and back isometric views, respectively, of an embodiment of the open framework structure 11 of the present invention. In preferred embodiments, structure 11 is comprised of structural steel tubing and supports work piece conveyor 12. Structure 11 further comprises a plurality of urethane bumpers 601 at the end points of carriage 18's (not shown in the figure) horizontal translation. Carriage 18 is preferably placed atop one or more rails 602 that are located upon or form a portion of structure 11. Rails 602 facilitate horizontal translation of carriage 18. In FIG. 14a and 14b, rails 602 are preferably V-shaped and engage V-shaped grooves within the plurality of wheels 703 of carriage 18 (see FIG. 15).

In both embodiments depicted in FIGS. 1 through 4 and FIGS. 5 through 8, carriage 18 further comprises a hoist 19 that is connected to the inner frame assembly 13 and allows vertical translation of inner frame assembly 13, and the work piece or object contained therein, from a first position to a second position in the direction shown by arrow D. Carriage 18 further comprises a handle 20 that is within reach of the operator and allows the operator to translate the carriage and the inner frame assembly 13 and workpiece attached thereto (not shown) horizontally in the direction of arrow E. Handle 20 also has a control box 21 that allows the operator to operate hoist 19 and various components of inner frame assembly 13 such as the translation of the extension arms 15, the attachment of part gripper 513 to the work piece, the 360 degree rotation along the central axis of part gripper 513, the 360 degree rotation of inner frame assembly 13 about the axis of central shaft 16, and the operation of various brake systems on inner frame assembly 13.

Figure 15:
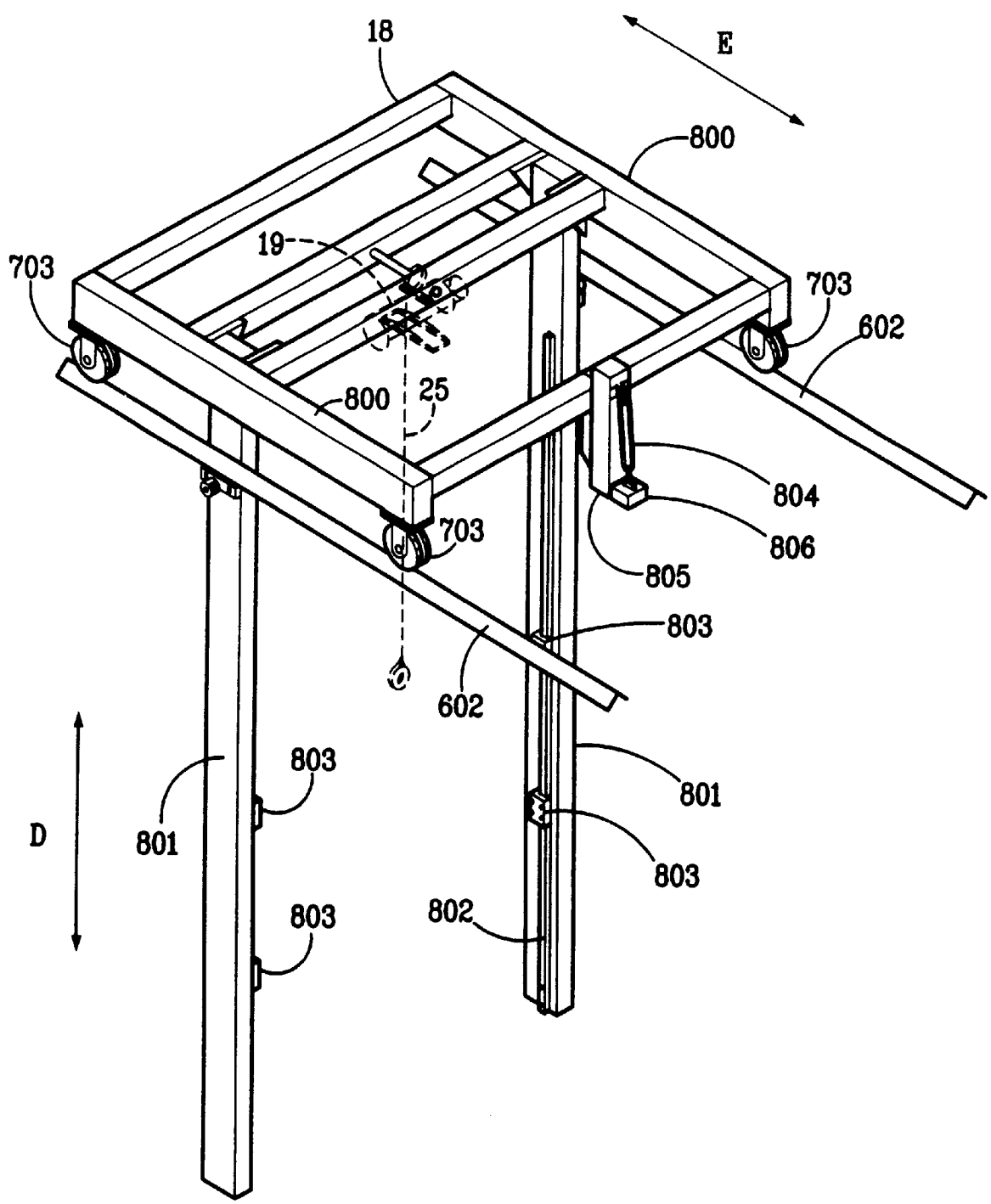
FIG. 15 provides a detailed, isometric view of an embodiment of the carriage of the present invention.
Figure 16A:
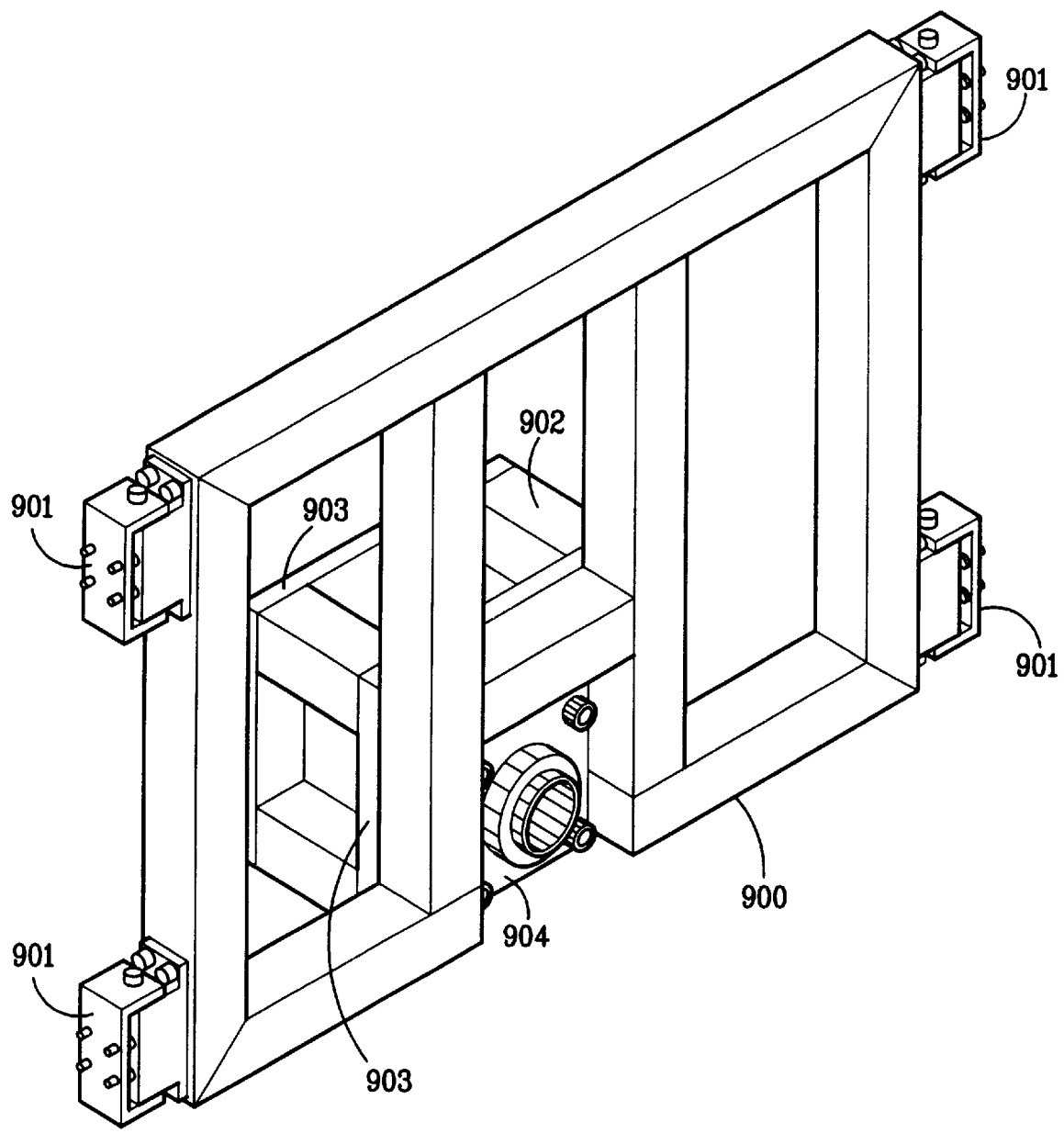
FIG. 16a provides a detailed, front isometric view of an embodiment of the yoke assembly of the present invention.
Figure 16B:
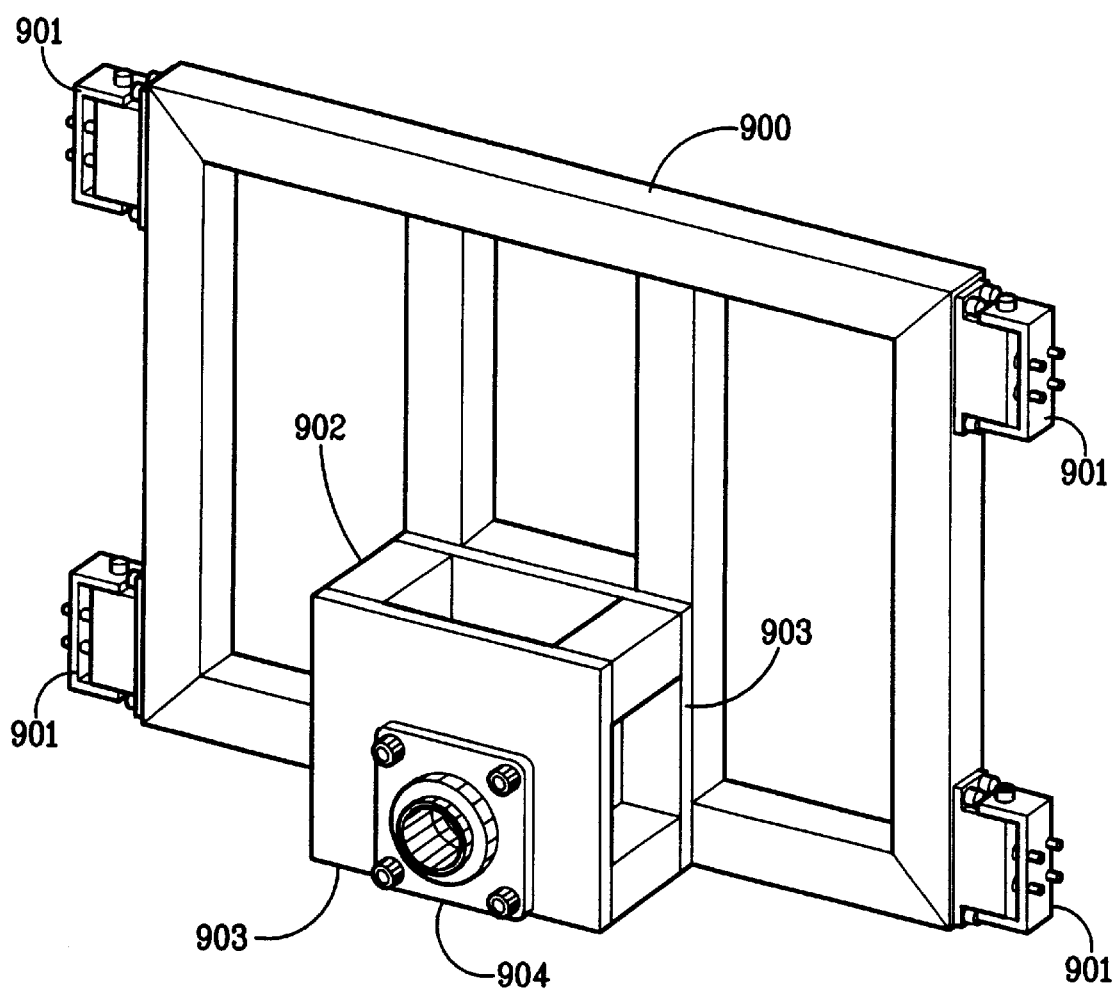
FIG. 16b provides a detailed, back isometric view of an embodiment of the yoke assembly of the present invention.

Hoist 19 is preferably a pneumatic or air hoist that is joined to a portion of inner frame assembly 13 by one or more linkages. In some embodiments, such as the embodiment of the vertical manipulator in FIGS. 1 through 4, the linkage is comprised of a reciprocating rod 22 that is housed within a cage 23 and platform 24 which supports hoist 18. In one embodiment, such as the horizontal manipulator depicted in FIGS. 5 through 8, the inner frame assembly 13 is mounted to a translatable yoke assembly 900 which is connected to the hoist 19 via a pair of vertical spacer beams 801 and connected to the hoist via a cable linkage 25. FIG. 15 provides a detail of an embodiment of the carriage 18 and vertical spacer beam 801 arrangement for a horizontal manipulator of the present invention. FIG. 16a and FIG. 16b provide detailed, front and back isometric views, respectively, for translatable yoke assembly 900.

FIG. 15 provides detail of carriage 18 for an embodiment of the horizontal manipulator illustrated in FIG. 5 through FIG. 8. Hoist 19 is depicted in shadow lines and shows linkage 25 that extends to attach to the yoke assembly (not shown). As FIG. 15 illustrates, carriage 18 is comprised of a pair of vertical spacer beams 801 that are attached to side rails 800. On each vertical spacer beam 801, bolt plate 802 is attached to the beam to act as a guide rail for LM blocks 803 (such as the LM blocks, part no. SR30W blocks manufactured by THK Manufacturing of America, Inc.) that allow vertical translation of the yoke assembly (not shown in FIG. 15) from a first position to a second position in the direction indicated by arrows D. Carriage 18 further comprises an additional air cylinder 804 mounted onto a hinge 805 and pivoting keeper 806.

As mentioned previously, FIGS. 16a and 16b provide detailed front and back isometric views of an embodiment of the yoke assembly 900 of the present invention. Yoke assembly 900 is attached to LM blocks 803 by brackets 901 to allow vertical translation of yoke assembly 900, and inner frame assembly 13 and work piece attached thereto (not shown in the figure). Yoke assembly 900 further comprises a inner framework assembly support cage 902, one or more mounting plates 903, and one or more flange bearings 904 (such as a bearing manufactured by McGill, Incorporated of Illinois.) that are preferably mounted onto mounting plates 903. One or more of bearings 904 contact a portion of the central shaft 16 of inner frame assembly 13 to facilitate 360 degree rotation about the axis of central shaft 16.

Consider an exemplary object, such as a rectangular transformer tank, that weighs about 100 pounds and is 20 inches deep front to back. Initially, the tanks may sit in a vertical position on a conveyor, and an operator wishes to manually weld the tank, rotate it a few degrees, and then set it in a horizontal position on conveyor 12 or a transport cart to its next operation. In embodiments where the inner frame assembly 13 is oriented vertically, an operator can then use handle 20, attached to carriage 18, to horizontally translate carriage 18 and the inner frame assembly 13 attached thereto to the location of the tank. The operator may then lower or vertically translate the inner frame assembly 13 through the use of the hoist 19 and reciprocating rod to position the extension arms 15 so that part grips 513 at the end of extension arms 15 are positioned substantially near the work piece's center of gravity. The controls for the hoist may be mounted at control panel 21 or via a separate air control pendant (not shown in figures). The operator can translate the extension arms inwardly using the controls 21 mounted on the end of carriage handle 20 to have the part grips 513 touch the surface of the work piece.

In preferred embodiments, part grips 513 are vacuum gripper cups. A vacuum is drawn against the surface of the work piece and maintained throughout the manipulation of the work piece. The work piece can rotate forwards and backwards preferably along the axis part grip 513 through the aid of one or more rotating shafts. Inner frame assembly 13 further comprises a vertically oriented central shaft 16 that is attached to the top surface of the support member 14 substantially near its mid point. Inner frame assembly 13 and the work piece can be rotated 360 degrees about a vertical axis in both directions, or about the axis of central shaft 16. The operator may stop the rotation of the work piece as its rotating along the axis of part grip 513 or central shaft 16 through the use of manual controls or foot switches that control the brakes (not shown in the figures).

Similarly, in embodiments where the inner frame assembly 13 is oriented horizontally, an operator can use handle 20, attached to carriage 18, to horizontally translate carriage 18 and the inner frame assembly 13 attached thereto to the location of the tank. The operator may then lower or vertically translate the inner frame assembly 13, that is attached to yoke assembly 901, through the use of hoist 19 and the LM system mounted on vertical support beams 801 of the carriage, to position the extension arms 15 so that part grips 513 at the end of extension arms 15 are positioned substantially near the work piece's center of gravity. The controls for the hoist may be mounted at control panel 21 or via a separate air control pendant (not shown in figures). The operator can translate the extension arms inwardly using the controls 21 mounted on the end of carriage handle 20 to have the part grips 513 touch the surface of the work piece.

In preferred embodiments, part grips 513 are vacuum gripper cups. A vacuum is drawn against the surface of the work piece and maintained throughout the manipulation of the work piece. The work piece can rotate forwards and backwards preferably along the axis of part grip 513 through the aid of one or more rotating shafts. Inner frame assembly 13 further comprises horizontally mounted central shaft 16 that is attached to the top surface of the support member 14 substantially near its mid point. Inner frame assembly 13 and the work piece can be rotated 360 degrees in both directions about a horizontal axis or about the axis of central shaft 16. The operator may stop the rotation of the work piece as its rotating along the axis of part grip 513 or central shaft 16 through the use of manual controls or foot switches that control the brakes (not shown in the figures).

Thus there have been described preferred embodiments of a manipulator for safe, vertical and horizontal translation and 360 degree, rotation along at least two axes. Although the present invention has been described with reference to work pieces that are large, rectangular enclosures, such as tanks for pad mounted transformers, it should be understood that a manipulator according to the present invention can be used generally to balance a load that is large and cumbersome with little physical exertion from the operation. While the present invention has been particularly shown and described with reference to the presently preferred embodiments thereof, it is understood that the invention is not limited to the embodiments specifically disclosed herein. Numerous changes and modifications may be made to the preferred embodiment of the invention, and such changes and modifications may be made without departing from the spirit of the invention. It is therefore intended that the appended claims cover all such equivalent variations as fall within the true spirit and scope of the invention.

I claim:

1. An apparatus for lifting and rotating an object, said apparatus comprising:
    a support structure;
    an inner frame assembly, said inner frame assembly translating horizontally and vertically from a first position to a second position along the framework, and comprising a support member having a first and second end and top and bottom surfaces, a plurality of extension arms disposed at the first and second ends of the support member, a central shaft attached to the top surface of the support member substantially perpendicular to the support member, and one or more bearings that facilitate 360° rotation along the axis of the central shaft; and
    a plurality of rotating shafts, coupled to the extension arms, and comprising bearings that allow 360° rotation along the axis of the rotating shaft and one or more part grips to engage the object.

2. The apparatus of claim 1 wherein the extension arms of the inner frame assembly further comprise one or more brake systems.

3. The apparatus of claim 1 wherein the inner frame assembly further comprises one or more rotary actuators.

4. The apparatus of claim 1 wherein the extension arms of the interior frame are vertical.

5. The apparatus of claim 1 wherein the extension arms of the interior frame are horizontal and substantially parallel to the central axis of the central shaft.

6. The apparatus of claim 1 wherein the part grips engage the object by drawing a vacuum.

7. The apparatus of claim 1 wherein the inner frame assembly further comprises a rotary union.

8. An apparatus for translation and rotation of a workpiece, the apparatus comprising:
    an inner frame assembly that comprises a support member that is rotatably coupled to a central shaft and allows 360° rotation along the axis of the central shaft, and further comprises one or more rotary actuators, one or more brakes, and one or more extension arms;
    a plurality of rotating shafts that are mounted onto each end of the extension arms and comprise one or more part grips that engage the workpiece, a plurality of bearings that allow 360° rotation along the central axis of the part grips, and one or more brakes to hold the workpiece in position; and
    a support structure that comprises a carriage, one or more rails, and a hoist attached to the carriage, the carriage allows the inner frame assembly to translate horizontally and the hoist allows the inner frame assembly to translate vertically.

9. The apparatus of claim 8 wherein the inner frame assembly is positioned vertically.

10. The apparatus of claim 8 wherein the inner frame assembly is positioned horizontally.

11. The apparatus of claim 8 wherein the part grips engage the work piece by drawing a vacuum.

12. The apparatus of claim 8 wherein the inner frame assembly further comprises a rotary union.

13. An apparatus for lifting and rotating an object, said apparatus comprising:
    a support structure having one or more rails and a carriage capable of translating horizontally from a first position to a second position across the rails and further comprising a hoist;
    an inner frame assembly comprised of a support member having a top surface, a bottom surface, a first end and a second end, the support member further comprising one or more arms having a first end and a second end, the first end of the arms extending from the bottom surface of the support member;
    a plurality of rotating shafts, coupled to the second end of the arms and comprising bearings that allow 360° rotation along the axis of the rotating shaft and one or more part grips to engage an object; and
    a central shaft that is connected to the top surface of the support member substantially midway between the first end and the second end of the support member and allows 360° rotation of the support member and arms attached thereto, the central shaft further connected to the hoist on the carriage which affords vertical translation of the inner frame assembly from a first position to a second position.

14. The apparatus of claim 13 wherein the inner frame assembly is positioned vertically.

15. The apparatus of claim 13 wherein the inner frame assembly is positioned horizontally.

16. The apparatus of claim 13 wherein the part grips engage the work piece by drawing a vacuum.

17. The apparatus of claim 13 wherein the inner frame assembly further comprises a rotary union.

* * * * *